(12) United States Patent
Frashure

(10) Patent No.: US 7,729,813 B2
(45) Date of Patent: *Jun. 1, 2010

(54) FEATURE ENABLER UNIT

(75) Inventor: Timothy J. Frashure, Columbia Station, OH (US)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 67 days.

This patent is subject to a terminal disclaimer.

(21) Appl. No.: 11/860,382

(22) Filed: Sep. 24, 2007

(65) Prior Publication Data

US 2008/0009982 A1   Jan. 10, 2008

Related U.S. Application Data

(63) Continuation of application No. 10/848,949, filed on May 19, 2004, now Pat. No. 7,274,977.

(51) Int. Cl.
*G06F 19/00* (2006.01)
*G06F 7/00* (2006.01)

(52) U.S. Cl. .............................. 701/1; 701/2

(58) Field of Classification Search ................ 701/1–2, 701/29; 702/182–185
See application file for complete search history.

(56) References Cited

U.S. PATENT DOCUMENTS

| | | | |
|---|---|---|---|
| 4,098,542 A | 7/1978 | Rajput et al. | |
| 4,602,127 A | 7/1986 | Neely et al. | |
| 4,837,552 A | 6/1989 | Vandemotter et al. | |
| 5,290,191 A | 3/1994 | Foreman et al. | |
| 5,327,781 A | 7/1994 | Moran et al. | |
| 5,341,298 A | 8/1994 | Singleton et al. | |
| 5,491,418 A | 2/1996 | Alfaro et al. | |
| 5,541,840 A | 7/1996 | Gurne et al. | |
| 5,554,049 A | 9/1996 | Reynolds | |
| 5,613,744 A | 3/1997 | Eslinger et al. | |
| 5,626,479 A | 5/1997 | Hughes | |
| 5,649,749 A | 7/1997 | Kullmann et al. | |
| 5,729,164 A | 3/1998 | Pattantyus | |
| 5,739,592 A | 4/1998 | Rigsby et al. | |
| 5,766,020 A | 6/1998 | Hughes | |
| 5,835,873 A | 11/1998 | Darby et al. | |
| 6,025,563 A | 2/2000 | Lesesky et al. | |

(Continued)

FOREIGN PATENT DOCUMENTS

| | | |
|---|---|---|
| EP | 0773650 A2 | 5/1997 |
| EP | 1158718 A2 | 11/2001 |
| GB | 2217029 A | 10/1989 |
| GB | 2290631 A | 1/1996 |
| WO | 01/01261 A2 | 1/2001 |

OTHER PUBLICATIONS

International Search Report from PCT/US2005/017187, dated Oct. 6, 2005.

(Continued)

*Primary Examiner*—Yonel Beaulieu
(74) *Attorney, Agent, or Firm*—Calfee, Halter & Griswold LLP

(57) ABSTRACT

An enabling unit for activating a feature in an electronic control unit on a vehicle includes a port for communicating with an electronic control unit included on the vehicle. A processor, which communicates with the port, includes a message for enabling a dormant feature included on the electronic control unit.

16 Claims, 3 Drawing Sheets

U.S. PATENT DOCUMENTS

| | | |
|---|---|---|
| 6,028,537 A | 2/2000 | Suman et al. |
| 6,114,952 A | 9/2000 | Francesangeli et al. |
| 6,237,401 B1 | 5/2001 | Haehn et al. |
| 6,380,826 B1 | 4/2002 | Palinkas |
| 6,798,084 B1 | 9/2004 | Gobel et al. |
| 6,947,816 B2 | 9/2005 | Chen |
| 2003/0003777 A1 | 1/2003 | Lesesky et al. |
| 2004/0083040 A1 | 4/2004 | Parrott et al. |
| 2005/0146458 A1* | 7/2005 | Carmichael et al. ........... 342/52 |

OTHER PUBLICATIONS

Interface Circuit, XP 000581343, 2244 Research Disclosure, Mar. 1996, No. 383, Emsworth, GB.

Joseph Rouquette, Controle De L'abs Sur Les Vehicules De La Gamme Volvo, ABS, No. 91 Boulogne-Billancourt, France, 2415 Diesel Technical Information Sheet, Jan./Feb. 1995.

* cited by examiner

FEATURE ENABLER UNIT

This application is a continuation of U.S. application Ser. No. 10/848,949, filed May 19, 2004 and issued as U.S. Pat. No. 7,274,977 on Sep. 25, 2007, which is hereby incorporated by reference.

BACKGROUND

The present invention relates to communication modules that communicate with an electronic control unit (ECU) for enabling dormant (unactivated) features stored in the ECU. It finds particular application with communication modules that communicate with an ECU in a vehicle. It will be appreciated, however, that the invention is also amenable to other applications.

Software functions (features) are used in the automotive and heavy vehicle industries for controlling various aspects of a vehicle. For example, some software features control the operation of the engine while other features control the operation of the brakes (e.g., antilock braking systems (ABS)). Other software features may include base changes to an electronic control unit (ECU) operation. As an example, configuration options, parameter sets, or customer specific options of ABS may be changed. Sales of such software features are extremely difficult to control and monitor in the automotive and heavy vehicle industries, which results in a high rate of software piracy.

Because there is no reliable means for enforcing payment from end users of software features in the automotive and heavy vehicle industries, the software features are commonly given away as a bonus without charging end users. Likewise, software for interfacing with the ECU is also typically given away as a cost of doing business.

The present invention provides a new and improved apparatus and method which addresses the above-referenced problems.

SUMMARY

In one embodiment, an electronic module includes a connector communicating with an electronic control unit. A controller, communicating with the connector, includes software code for enabling a feature included on the electronic control unit.

In another embodiment, an enabling unit for activating a feature in an electronic control unit on a vehicle includes a port for communicating with an electronic control unit on the vehicle. A processor, communicating with the port, includes a message for enabling a dormant feature included on the electronic control unit.

An electronic module includes a port, which communicates with an electronic control unit on a vehicle, and a means for communicating software code, via the port, for enabling a feature on the electronic control unit.

In another embodiment, a system for controlling a vehicle includes an electronic control unit on the vehicle for controlling a vehicle system. A communication link on the vehicle communicates with the electronic control unit. An electronic module includes a port, which communicates with the electronic control unit, and a controller, which communicates with the port and includes a software message for enabling a feature included on the electronic control unit.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
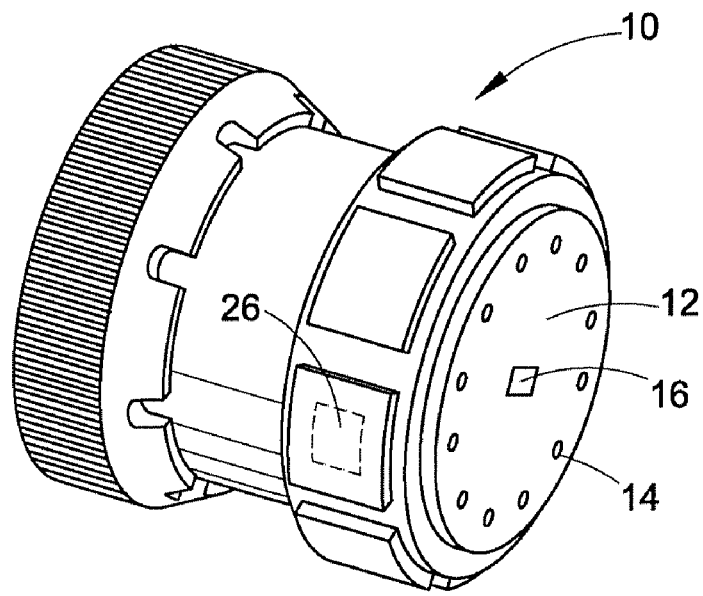
FIG. 1 illustrates a front perspective view of an electronic module in accordance with one embodiment of the present invention.
Figure 2:
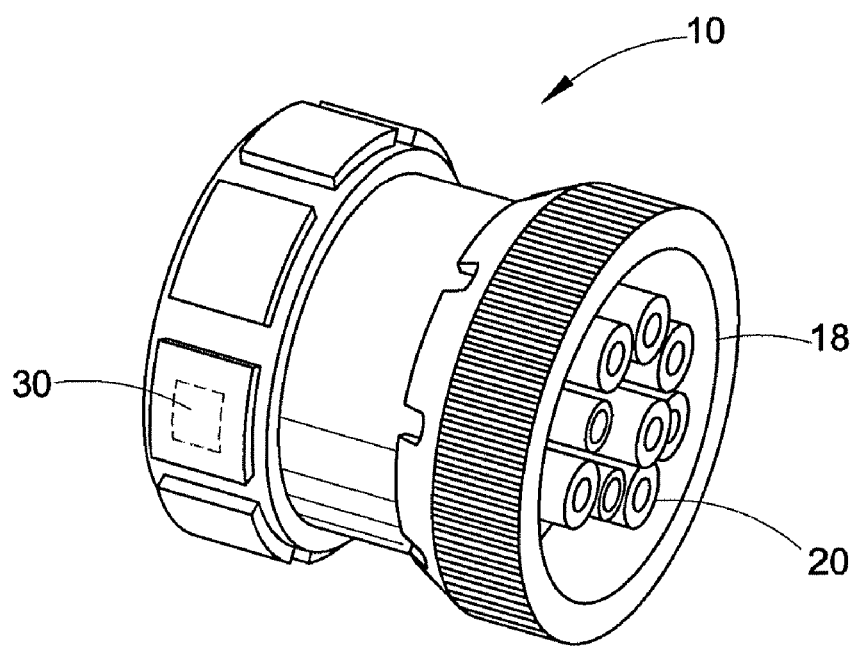
FIG. 2 illustrates a rear perspective view of the electronic module in accordance with one embodiment of the present invention.

FIGS. 1 and 2 illustrate front and rear perspective views of an electronic module 10 (enabling unit) in accordance with one embodiment of the present invention. A front face 12 of the electronic module 10 includes an output means 14 (e.g., an output device including light emitting diodes (LEDs)) for communicating various messages to a user. In the illustrated embodiment, the output means 14 includes twelve (12) output devices, which are activated in various combinations and colors for communicating different messages to the user.

The front face 12 also includes a switching means 16, which is discussed in more detail below. In the illustrated embodiment, the switching means 16 is a magnetic switch that is activated when a user positions a magnet within a predetermined distance of the front face 12. However, other types of switching means 16, including single-pole double-throw switches, are also contemplated.

The rear portion 18 of the electronic module 10 includes a connector 20 (port), which is configured for communicating with an electronic control unit (ECU) 22 (see FIG. 3) of a vehicle. In the illustrated embodiment, the connector 20 is an electrical connector configured for communicating with a serial communication link 24 (see FIG. 3) of a vehicle. Although the present invention is described in terms of the ECU controlling a braking function of a vehicle, it is to be understood that the electronic module 10 may communicate with any type of ECU. Furthermore, as described below with reference to FIG. 4, it is to be understood that the electronic module 10 may communicate with a plurality of ECUs that, for example, control various functions (e.g., engine tasks, fuel usage, monitoring alternator performance via a voltage link, tire pressure monitoring of a vehicle axle via wheel speed sensors, etc.) on the vehicle.

Figure 3:
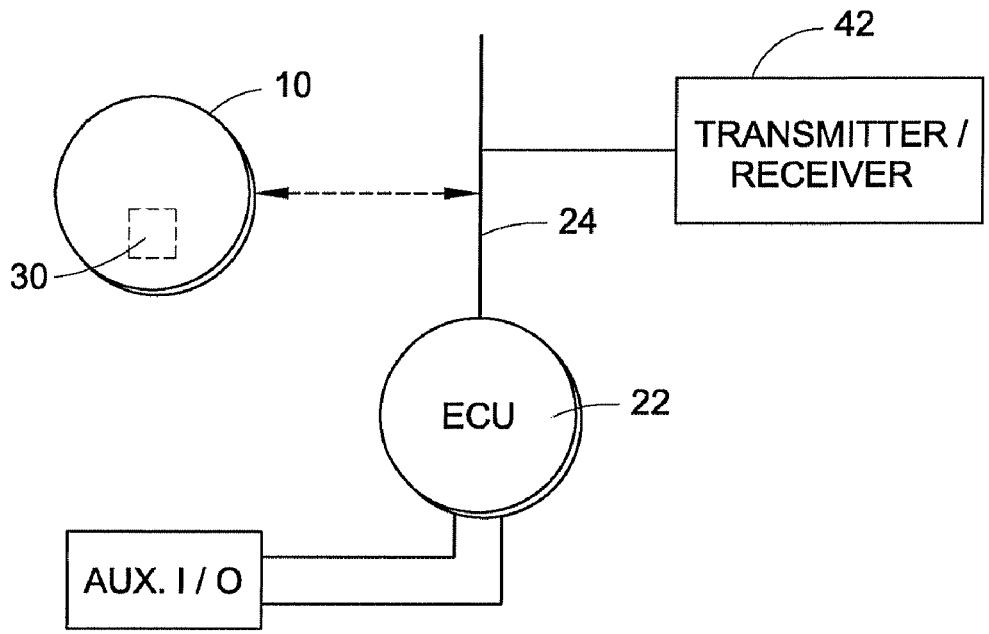
FIG. 3 illustrates a system including the electronic module communicating with an electronic control unit in accordance with one embodiment of the present invention.

With reference to FIGS. 1-3, the ECU 22 is used for controlling a braking function of the vehicle. Therefore, the ECU 22 includes primary software code that performs primary tasks (features) that may include, for example, causing a vehicle brake to be activated in a pulsed manner during certain driving conditions. Secondary software code may also be included in the ECU 22 for performing various ancillary tasks (features). However, it is to be understood that at least a portion of the secondary software is dormant (not enabled) at the time when the ECU 22 is installed in the vehicle. Consequently, the ancillary features associated with the secondary software are dormant and not performed.

A controller 30 (processor or microprocessor) in the electronic module 10 electrically communicates through the connector 20 and includes a message in the form of software code for enabling (activating) one or more of the dormant features on the ECU 22. The dashed lines representing the controller 30 are meant to illustrate that the controller is inside the electronic module 10. The controller 30 includes software code for enabling one or more features on the ECU 22. Therefore, the controller 30 acts as a means for communicating software code to the ECU 22 for activating the dormant feature.

A user causes the electronic module 10 to communicate with the ECU 22 when it becomes desirable to enable a dormant feature on the ECU 22. More specifically, in the embodiment illustrated in FIG. 3, the electronic module 10 is electrically connected to the communication link 24 of the vehicle via the connector 20. Once the electronic module 10 communicates with the ECU 22, the software included on the controller 30 for enabling the dormant feature on the ECU 22 is capable of being transmitted to the ECU 22.

In one embodiment, the software for enabling the dormant feature on the ECU 22 is only transmitted to the ECU 22 a predetermined number of times (e.g., once). If the software is only transmitted to the ECU 22 once, the electronic module 10 is a single use device. It is to be understood that the dormant feature may be temporarily enabled in the ECU 22 only during the time that the electronic module 10 is communicating with the ECU 22. Alternatively, the dormant feature may be permanently enabled in the ECU 22 even after the electronic module 10 no longer communicates with the ECU 22, in which case the configuration of the ECU 22 is changed by the electronic module 10. In either case, the electronic module 10 will only transmit the software for enabling the dormant feature on the ECU 22 the predetermined number of times (e.g., a single time to a single ECU).

Therefore, in this embodiment, once the electronic module 10 begins communicating with the ECU 22 (e.g., when the controller 30 is in a communication mode with the ECU 22), the controller 30 determines whether the software code for enabling the dormant feature should be transmitted to the ECU 22. For example, an electronic marker is transmitted from the controller 30 to the ECU 22 (or vice versa) along with the message. Then, when the controller 30 subsequently communicates with the ECU 22 again in the future, the controller 30 first determines whether the electronic marker was previously transmitted to the ECU 22. If the ECU 22 includes the electronic marker, the controller 30 will determine not to transmit the software message for enabling the feature. Alternatively, it is also to be understood that the electronic marker, which may include a specific identifier of the ECU, may be stored in the electronic module.

Figure 4:
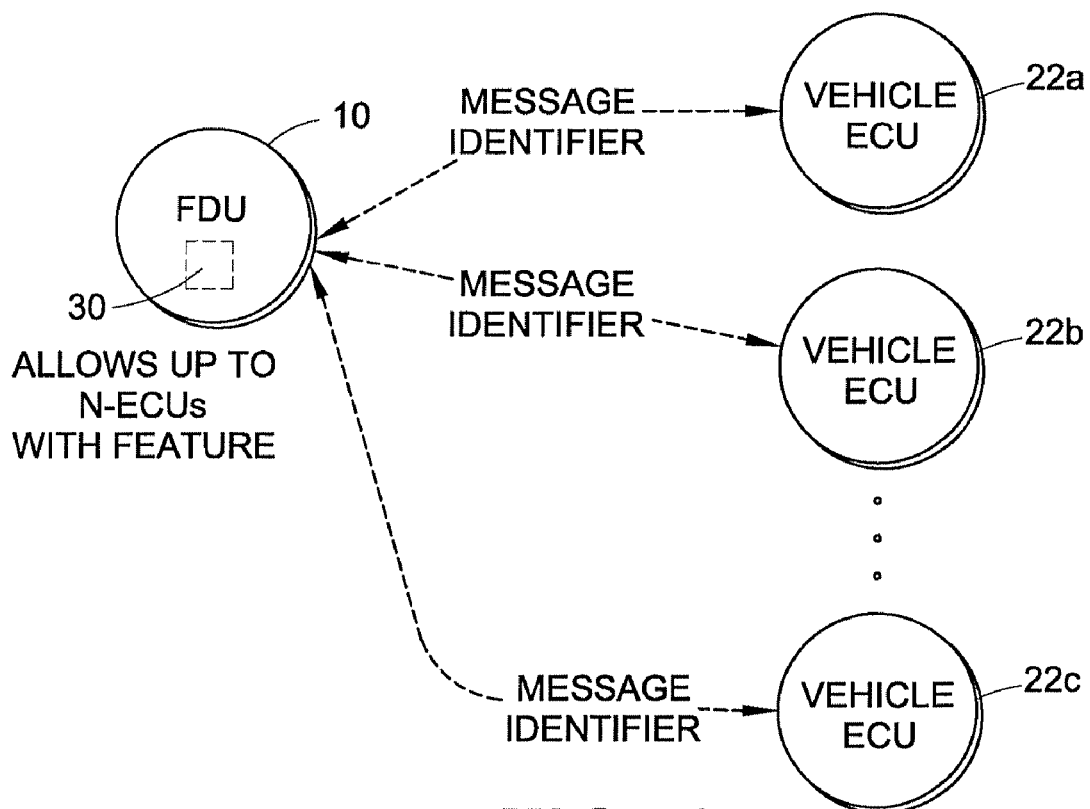
FIG. 4 illustrates a functional diagram illustrating an electronic module communicating with a plurality of electronic control units in accordance with one embodiment of the present invention.

In another embodiment illustrated in FIG. 4, the controller 30 maintains a list (e.g., a lookup table) identifying all of the vehicles to which the software message is authorized to be transmitted. For example, all vehicles in a particular fleet may be identified in the lookup table. Furthermore, every time the controller 30 begins communicating with an ECU 22a, 22b, 22c of a particular vehicle, the controller 30 retrieves a vehicle identifier (e.g., a vehicle identifier from an engine ECU or a chassis ECU) or an ECU identifier via the vehicle's communication link and determines whether the vehicle is included on the authorized list. If the vehicle is not included on the authorized list, the controller 30 will not transmit the software message to the ECU 22a, 22b, 22c.

With reference again to FIG. 1-3, the message is only transmitted from the controller 30 to the ECU 22 in another embodiment when the switching means 16 is activated. For example, if the switching means 16 is a magnetic switch, the message is only transmitted to the ECU 22 when a magnet is held within a predetermined distance of the switching means 16 for a predetermined period of time. Furthermore, if a plurality of software messages are maintained on the controller 30 for enabling a plurality of respective features on the ECU 22, a user may determine which of the messages is to be transmitted to the ECU 22 by activating and deactivating the switching means 16 in a predetermined pattern. Also, the user may activate the switching means 16 for resetting the controller 30, the ECU 22, and/or the vehicle system associated with the ECU.

In another embodiment, the ECU 22 transmits a reply message (software code) to the controller 30 for identifying a status of the ECU and/or the associated vehicle system. For example, the reply message may include diagnostic information of the ECU and/or the associated vehicle system. The reply message is deciphered by the controller 30 and output to the user via the output means 14. For example, the electronic module 10 may have specific inputs or outputs for specific features. In one embodiment, the output means 14 may illuminate specific one(s) of the LEDs for a new type of diagnostic feature. Also, the switching means 16 may be used for enabling a specific feature option.

Figure 5:
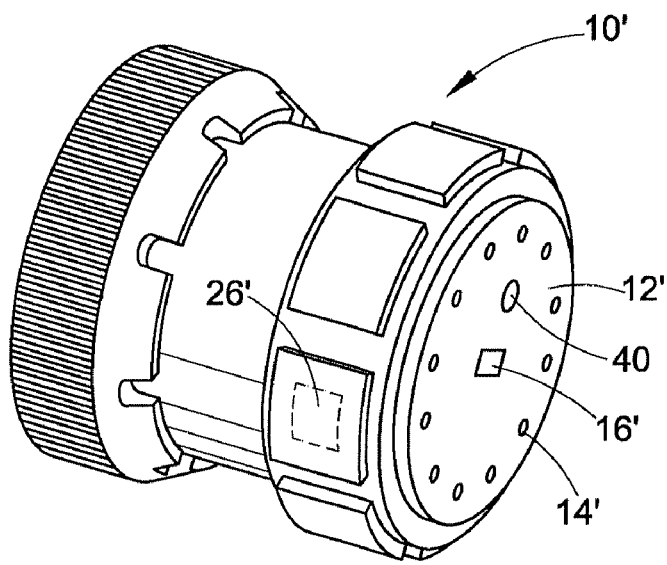
FIG. 5 illustrates an electronic module in accordance with another embodiment of the present invention.

FIG. 5 illustrates another embodiment of the present invention. For ease of understanding this embodiment of the present invention, like components are designated by like numerals with a primed (') suffix and new components are designated by new numerals. In this embodiment, the connector 40 of the electronic module 10' is a wireless connector including a transmitter/receiver capable of communicating with a transmitter/receiver 42 (see FIG. 3) that communicates with the ECU 22 (see FIG. 3) via the communication link (see FIG. 3). In one embodiment, the wireless communications are achieved via radio frequency signals. Also, it is contemplated that the transmitter/receiver 42 is included within the ECU. However, other types of wireless communications are also contemplated.

Figure 6:
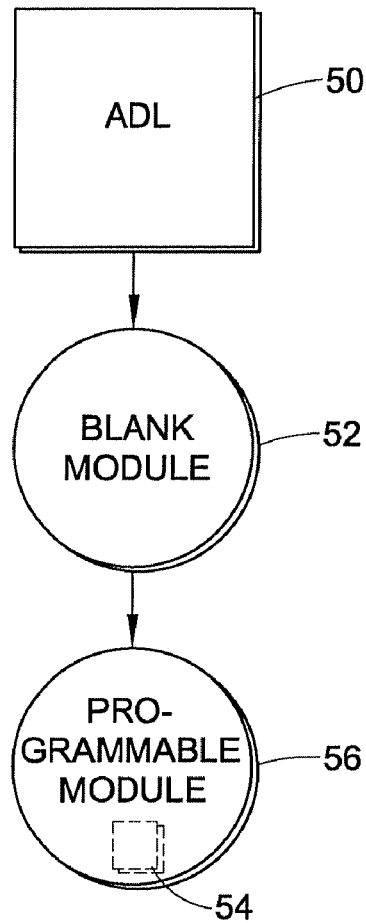
FIG. 6 illustrates a functional diagram for loading software onto the electronic module in accordance with one embodiment of the present invention.

FIG. 6 illustrates a functional diagram of how the electronic module is programmed with the software code message for enabling a feature on an ECU. The software message, which is illustrated as 50, is transmitted to a blank electronic module, which is illustrated as 52. In one embodiment, the software message is "burned" into the controller 54 as firmware and, therefore, is considered to be permanently stored in the controller 54. The electronic module including the software in the controller 54 is illustrated as 56. In one embodiment, the software is in an auxiliary design language (ADL) format. However, other types of software formats are also contemplated.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. An electronic module, comprising: a portable connector selectively connected to a communication link of a vehicle, an electronic control unit on the vehicle communicating with the communication link; and a controller selectively communicating with the electronic control unit via the portable connector and transmitting software code to the electronic control unit for enabling a feature included on the electronic control unit.

2. The electronic module as set forth in claim 1, wherein the controller transmits the software code a predetermined number of times.

3. The electronic module as set forth in claim 1, wherein the controller receives a reply software code from the electronic control unit after transmitting the software code.

4. The electronic module as set forth in claim 1, further including: an output device indicating communications between the controller and the electronic control unit.

5. The electronic module as set forth in claim 1, further including: a switch for activating the controller to transmit the software code to the electronic control unit.

6. The electronic module as set forth in claim 5, wherein the switch is a magnetic switch.

7. The electronic module as set forth in claim 1, wherein: the connector is configured to communicate with a serial communication link of a vehicle; and the electronic control unit communicates with the communication link.

8. The electronic module as set forth in claim 1, further including: a wireless transmitter, the connector communicating with the electronic control unit via the wireless transmitter.

9. The electronic module as set forth in claim 1, wherein the software code is previously burned into the controller.

10. An enabling unit for activating a feature in an electronic control unit on a vehicle, comprising: a port, which is a connector configured to connect with a connector on the vehicle, communicating with the electronic control unit on the vehicle; and a processor, communicating with the port, transmitting a message to the electronic control unit for enabling a dormant feature included on the electronic control unit.

11. An enabling unit for activating a feature in an electronic control unit on a vehicle, comprising: a port, which is a transmitter communicating with the electronic control unit via radio frequency waves; and a processor, communicating with the port, transmitting a message to the electronic control unit for enabling a dormant feature included on the electronic control unit.

12. An electronic module, comprising:
a port communicating with an electronic control unit on a vehicle; and
a processor for communicating software code, via the port, for enabling a feature on the electronic control unit.

13. The electronic module as set forth in claim 12, wherein the processor determines whether to communicate the software code to the electronic control unit as a function of whether the software code has previously been transmitted to the electronic control unit.

14. The electronic module as set forth in claim 12, wherein the processor determines whether to communicate the software code to the electronic control unit as a function of an identifier stored in the electronic control unit.

15. A system for controlling a vehicle, the system comprising: an electronic control unit on the vehicle for controlling a vehicle system; a communication link on the vehicle communicating with the electronic control unit; and an electronic module, including: a port communicating with the electronic control unit; and a controller, communicating with the port, transmitting a software message to the electronic control unit for enabling a feature included on the electronic control unit.

16. The system for controlling a vehicle as set forth in claim 15, wherein the controller transmits the message to the electronic control unit as a function of an identifier stored in the electronic control unit.

* * * * *